(12) United States Patent
Felgenhauer et al.

(10) Patent No.: US 8,631,926 B2
(45) Date of Patent: Jan. 21, 2014

(54) DEVICE FOR PUSHING GLASS OBJECTS ONTO A CONVEYOR BELT

(75) Inventors: Benedikt Felgenhauer, Herford (DE); Matthias Hubner, Stadthagen (DE)

(73) Assignee: Heye International GmbH (DE)

( * ) Notice: Subject to any disclaimer, the term of this patent is extended or adjusted under 35 U.S.C. 154(b) by 0 days.

(21) Appl. No.: 13/512,160

(22) PCT Filed: Apr. 23, 2011

(86) PCT No.: PCT/EP2011/002071
§ 371 (c)(1),
(2), (4) Date: May 25, 2012

(87) PCT Pub. No.: WO2011/157315
PCT Pub. Date: Dec. 22, 2011

(65) Prior Publication Data
US 2013/0153367 A1    Jun. 20, 2013

(30) Foreign Application Priority Data

Jun. 18, 2010   (DE) .......................... 10 2010 024 301

(51) Int. Cl.
*B65G 47/34* (2006.01)
(52) U.S. Cl.
USPC .................. 198/598; 198/430; 198/457.07
(58) Field of Classification Search
USPC .............. 198/598, 599, 430, 457.07
See application file for complete search history.

(56) References Cited

U.S. PATENT DOCUMENTS

| 4,064,016 | A | * | 12/1977 | Vortmann ...................... 198/412 |
| 6,041,910 | A | * | 3/2000 | Avery et al. ............. 198/370.07 |
| 7,264,108 | B2 | * | 9/2007 | Borsarelli et al. ............ 198/429 |
| 7,278,529 | B2 | * | 10/2007 | Borsarelli et al. ............ 198/429 |
| 7,325,668 | B2 | * | 2/2008 | Borsarelli et al. ............... 198/430 |
| 7,426,990 | B2 | * | 9/2008 | Kammonen .................. 198/430 |
| 7,913,518 | B2 | | 3/2011 | Winkelhake et al. |
| 7,930,902 | B2 | * | 4/2011 | Simon et al. .................. 198/430 |
| 2012/0009048 | A1 | | 1/2012 | Winkelhake et al. |

FOREIGN PATENT DOCUMENTS

| DE | 102004010238 B3 | 6/2005 |
| DE | 102008027911 A1 | 12/2009 |
| EP | 1627858 A1 | 2/2006 |
| EP | 1886977 A1 | 2/2008 |
| GB | 2435025 A | 8/2007 |

* cited by examiner

*Primary Examiner* — James R Bidwell
(74) *Attorney, Agent, or Firm* — Fox Rothschild LLP

(57) ABSTRACT

A device having a pusher for pushing glass objects from a resting plate to a conveyor belt moving at a uniform speed. The device has first, second and third electric motors, the first motor mounted to be stationary, and the second and third motors being moveable relative to the first motor. The three motors are connected to the pusher via various transmission parts and controlled independently for controlling the motion of the pusher.

20 Claims, 4 Drawing Sheets

DEVICE FOR PUSHING GLASS OBJECTS ONTO A CONVEYOR BELT

BACKGROUND OF THE INVENTION

The invention relates to a device for pushing glass objects from a dead plate of an I.S. glassware forming machine onto a conveyor belt.

Such devices are intended to transfer the glass object, in particular a hollow glass object, which has been removed from a blow-mold of a glassware forming machine and placed on a stationary dead plate. The device then transfers the glass object by means of a pusher to a conveyor belt moving continuously at a uniform speed. The glass objects must be positioned on the conveyor belt one behind the other to be subsequently introduced into a lehr. In the case of I.S. (individual section) machines where the conveyor belt co-operates with a plurality of manufacturing stations, each of which is provided with a dead plate, the process of pushing the glass objects must take place within a time interval dependent upon the operating cycle of the remaining manufacturing stations and upon the transport speed of the belt. Moreover, the pushing procedure must be performed so as to avoid toppling of or damage to the glass objects and imprecise positioning on the belt. At the end of the movement along a transfer curve, each glass object must be arranged in a defined position on the belt and move with it in the same direction and at the same speed.

Document DE 10 2004 010 238 133 discloses a device of this type in which a first lever which at one of its ends can pivot about a vertical, positionally-fixed axis supports at its other end one end of a second lever which can also pivot about a vertical axis, the other end of the second lever having a pusher mounted thereon, said pusher in turn being pivotable about a perpendicular axis and being fitted with three pushing fingers. Allocated to the rotations of the first lever about the positionally-fixed axis, of the second lever with respect to the first lever and of the pusher with respect to the second lever are three positionally-fixed drives which can be controlled in a mutually independent manner, wherein a transfer curve beginning at a point of reception on the dead plate and ending at a point of delivery on the conveyor belt can be produced by the superposition of the three partial movements generated by the drives. The transfer of the rotational movements of the three drives via the levers to the pusher is effected by means of toothed belt gear mechanisms, the operation of which requires a great deal of maintenance. This is accompanied by a comparatively large constructional outlay which is governed by an initial combination of the driving movements of three fixedly disposed drives via hollow shafts guided one inside the other and subsequent separation of these movements for their introduction into the respective component whose rotational movement is to be controlled.

Document DE 2008 027 911 A1 discloses a further comparable device in which the pusher is fixedly connected to the end of a crank arm which is connected to a shaft in a rotationally-fixed manner, said shaft being mounted in a rotatable manner on a rotary disk eccentrically with respect to its positionally-fixed axis extending in parallel with said shaft. Said shaft forms the driven shaft of a first electric motor also supported by the rotary disk, wherein the rotary disk is drivingly connected directly with a second, positionally-fixed electric motor. This design indeed allows a simplification in the gear elements necessary for transferring the partial movements of the two electric motors, wherein, however, in comparison with the device known from document DE 10 2004 010 238 B3, there are fewer design options for producing a transfer curve since only two partial movements are to be superposed and the pusher is not pivoted with respect to said crank arm.

Finally, EP 1 886 977 A1 discloses a further device for pushing glass objects onto a conveyor belt, in which two electric motors disposed in a machine frame coaxially with respect to each other are fixedly connected to crank arms at the respective ends of their driven shafts, wherein the free end of one crank arm is articulated via a joint directly on a structure supporting a pusher and wherein the free end of the other crank arm is articulated via a joint with an intermediate lever and this, at its end remote from the crank arm, is articulated via a further joint on said structure. The axes of all the joints extend in parallel with each other. By controlling the two electric motors to rotate in the same direction, it is possible to produce a rotational movement of the pusher about the common axis of the two motors, wherein by way of the control to rotate in the same direction, it is possible to move the pusher closer to or further away from a dead plate or a conveyor belt. The transfer curve starting from a dead plate to a conveyor belt is thus a circular arc about the common axis of the two motors. Since only two partial movements are to be superposed, there are also fewer design options for the transfer curve in the case of this device compared with that described in document DE 10 2004 010 238 B3.

SUMMARY OF THE INVENTION

The object of the invention is to improve a device of the type mentioned above in a simple manner with the design options for the transfer curve being optimum and in particular tailored to requirements. This object is achieved by the present invention which provides a device for pushing glass objects from a dead plate of a section of an I.S. (individual section) glassware forming machine onto a moving conveyor belt. The device includes a pusher for pushing the glass objects and which is mounted on one end of a lever so as to be pivotable about a first vertical axis. The other end of the lever is connected to a vertically extending shaft which is mounted so as to be pivotable about a second vertical axis, wherein the shaft is disposed so as to be eccentrically rotatable about a positionally-fixed, vertically extending axis. A first electric motor is arranged to produce a rotational movement of the shaft about the fixed axis, is positionally-fixed, and has a vertically extending driven shaft. A second electric motor is arranged to produce a rotational movement of the shaft about the second vertical axis, and a third electric motor is arranged to produce a rotational movement of the pusher about the first vertical axis relative to the lever.

Accordingly, it is important for the invention that of the three electric motors, only one is positionally-fixed, with the other two, in contrast, mounted so as to rotate with a beam mounted in a positionally-fixed manner so as to be able to pivot about a vertical axis. The latter two motors are thus held eccentrically in relation to the positionally-fixed axis. With respect to the Prior Art mentioned above, in the case of embodiments in which three positionally-fixed electric motors, which can be controlled in a mutually independent manner, are present for the provision of three partial movements, as a result of the omission of gear components which are used for the initial, spatial combination and for the transfer of the partial movements, a considerably reduced constructional outlay is achieved. With respect to the Prior Art, in the case of embodiments in which two electric motors which can be controlled in a mutually independent manner are present for the provision of two partial movements, of which one electric motor is positionally-fixed, the advantage of improved options for producing, and in particular varying, the transfer curve is produced. The smaller number of parts, compared with known devices comprising three axes to be controlled, provides savings in production, assembly and maintenance.

The features of the invention are also directed towards an advantageous formation of the means for the pivoting of the pusher with respect to the crank arm supporting it. The four bar chain used in this case and incorporating a push rod can be considered as being low-maintenance and on the whole robust. It is particularly suitable for use under the operating conditions of a glass factory.

Further features of the invention are directed towards the arrangement and design of a receiving body connected to the beam and acting as a support for the two electric motors moving with the beam. One of the two receptacles continues as a preferably cylindrical projection part which extends coaxially with respect to the receptacle and in which there is mounted an annular body receiving the point of articulation of the push rod, with the interposition of a hollow shaft. A cover part, from which the sleeve extends on the upper side, forms the upper termination for the receiving body. The projection part is preferably formed in one piece with the cover part. The beam and the receiving body can also be formed in one piece with each other.

In another embodiment of the invention, the driving connection between the third electric motor and the hollow shaft is arranged via a spur gear mechanism. This is the only gear mechanism which is required in terms of transferring the driving movements of the three electric motors.

In still further embodiments, additional features are directed towards the design of a housing which at least partially receives the electric motors and transfer members disposed downstream thereof. This housing is formed to be closed and on the upper side is characterized by a protective sheet from which only the projection part mentioned in the introduction protrudes. The term "vertical" used in the previous embodiments and hereinafter is directed towards a flat base side of this housing. It is important that all the important components of the device are disposed to be protected from external influences arising from the operation of a glass factory.

The features of yet additional embodiments of the invention are directed towards the arrangement of the positionally-fixed electric motor within the housing. This is held in a frame fixed to the housing and for bearing the beam a hollow cylinder fixedly connected thereto is provided, by means of which the beam is mounted on a hollow shaft-like hub so as to be rotatable about its axis, wherein the driven shaft of the first electric motor extends within the hub. In this manner a stable bearing of the beam is provided which is particularly suitable for withstanding stresses.

Further protection of the device against the effects of heat, moisture, abrasive dust, etc. is achieved by the housing being disposed below the plane of a dead plate.

The mechanical concept of the device, unlike in the Prior Art illustrated above in which not many rotational movements are guided within each other, allows the use of stable carrier-support bearings whose dynamic load ratings turn out to be high which means that a correspondingly long service life is to be expected.

BRIEF DESCRIPTION OF THE DRAWINGS

The invention will be explained in more detail hereinafter with reference to the exemplified embodiment schematically illustrated in the drawings, in which.

DETAILED DESCRIPTION

Figure 1:
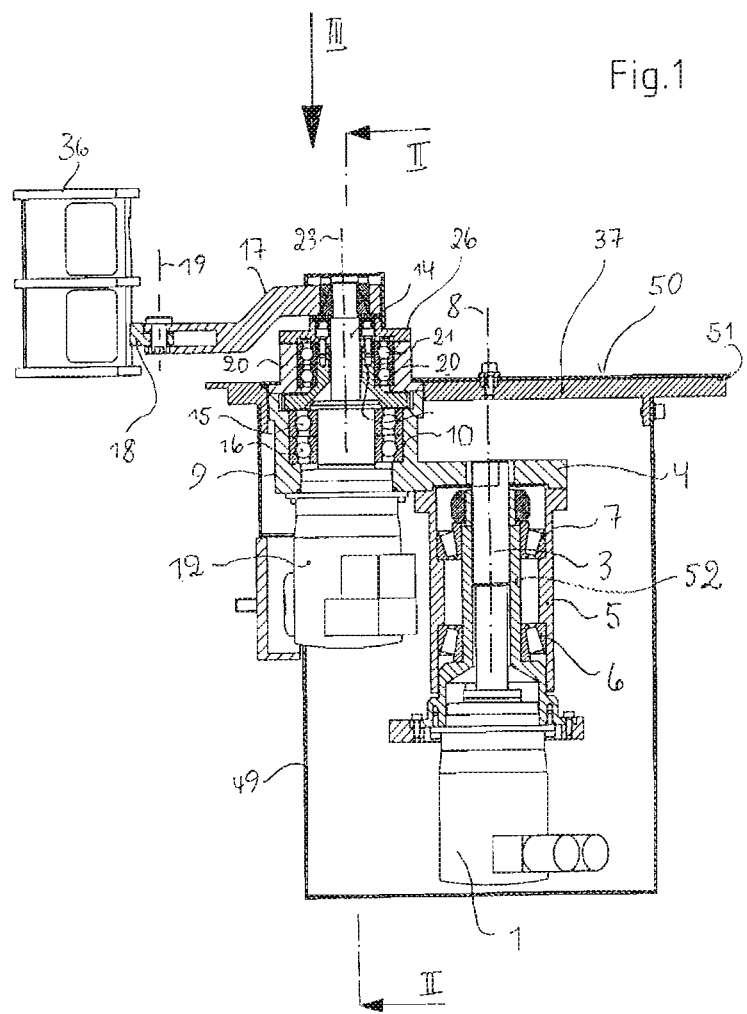
FIG. 1 shows an illustration of the device in accordance with the invention in a vertical sectional plane.

Reference numeral 1 designates a first electric motor disposed in a frame 2 in a positionally-fixed manner, the driven shaft 3 of which is connected to a beam 4 in a rotationally-fixed manner. The driven shaft 3 extends through a hollow shaft-like hub 52 and the beam 4 is connected to a hollow cylinder 5 surrounding the hub 52, the beam being mounted on the hub 52 via the hollow cylinder by means of roller bearings 6, 7.

Figure 2:
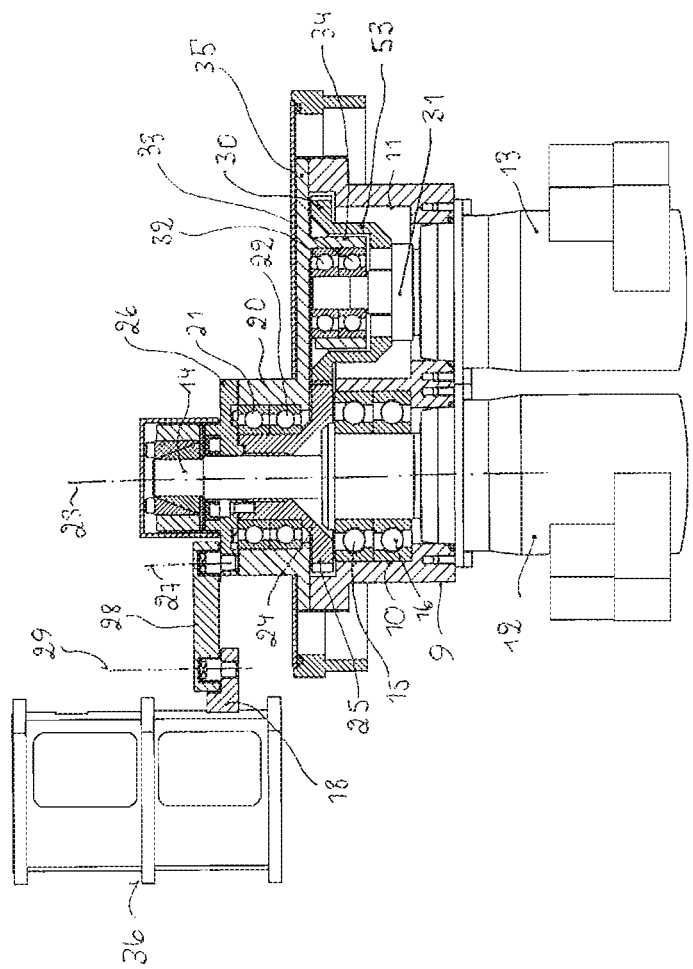
FIG. 2 shows a partially angularly offset illustration of the device of FIG. 1 in a sectional plane II-II.

The beam 4 which is thus mounted so as to be rotatable about a vertical, positionally-fixed axis 8 supports at its end remote from the axis 8 a receiving body 9 which, as shown in FIG. 2, comprises two cylindrical receptacles 10, 11 which are disposed next to each other and whose axes extend in parallel with the axis 8.

A second electric motor 12 is inserted into the lower portion of the receptacle 10 and a third electric motor 13 is inserted into the lower portion of the receptacle 11.

The shaft 14 mounted within the receptacle 10 via roller bearings 15, 16 is the driven shaft of the electric motor 12 and this is connected at its upper end to a crank arm 17 in a rotationally-fixed manner, which crank arm extends substantially perpendicular with respect to the shaft 14. The end of the crank arm 17 is articulated on a pusher 18 so as to be pivotable about a perpendicular axis 19.

A cylindrical projection part 20 is attached at its upper side to the receptacle 10 and has a first hollow shaft 24 mounted therein via roller bearings 21, 22, which hollow shaft extends coaxially with respect to the axis 23 of the driven shaft 14 and at its lower end supports a toothed ring 25. At its upper end, the hollow shaft 24 is fixedly connected to an annular body 26 on which one end of a push rod 28 is pivotably articulated about an axis 27, the other end of which is articulated on the pusher 18 so as to be pivotable about an axis 29 at a spaced disposition with respect to the axis 19.

The crank arm 17 forms together with the push rod 28 a four bar chain owing to the arrangement of the axes 19, 23, 27, 29 which means that in dependence upon a rotation of the hollow shaft 24 about the axis 23, a rotation of the pusher 18 about the axis 19 relative to the crank arm 17 can be produced.

The toothed ring 25 is engaged with a toothed ring 30 which is integrally formed on a second hollow shaft 53 connected to the driven shaft 31 of the third electric motor 13 in a rotationally-fixed manner and extending coaxially with respect thereto. The driven shaft 31 of the electric motor 13 is mounted by means of roller bearings 32, 33 in a cylindrical projection part 34—projecting into the receiving body 9—of a cover part 35 which is fixedly connected to the projection part 20. The two toothed rings 25, 30 form the only spur gear mechanism used in terms of the device.

Fastened to the pusher 18 in a manner known per se is an arrangement of pushing fingers 36 which are intended to push the glass objects.

Figure 3:
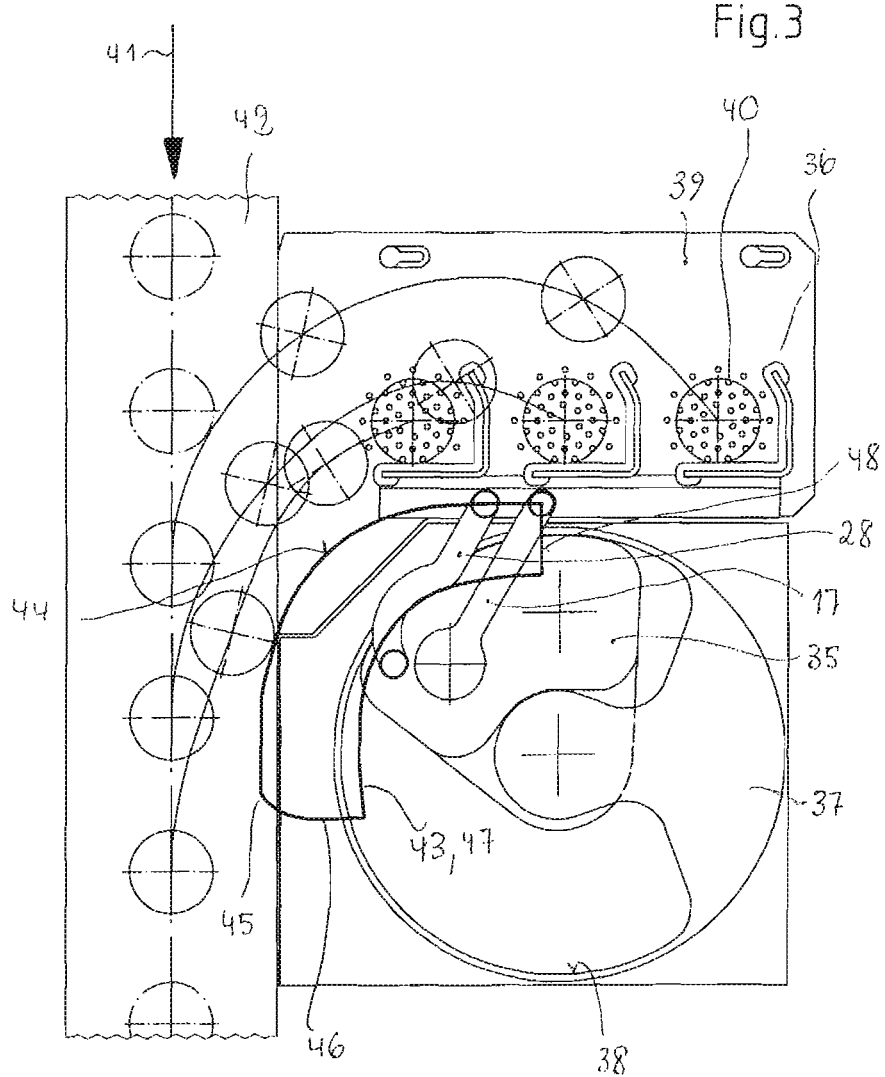
FIG. 3 shows a plan view of the device along viewing direction III of FIG. 1.
Figure 4:
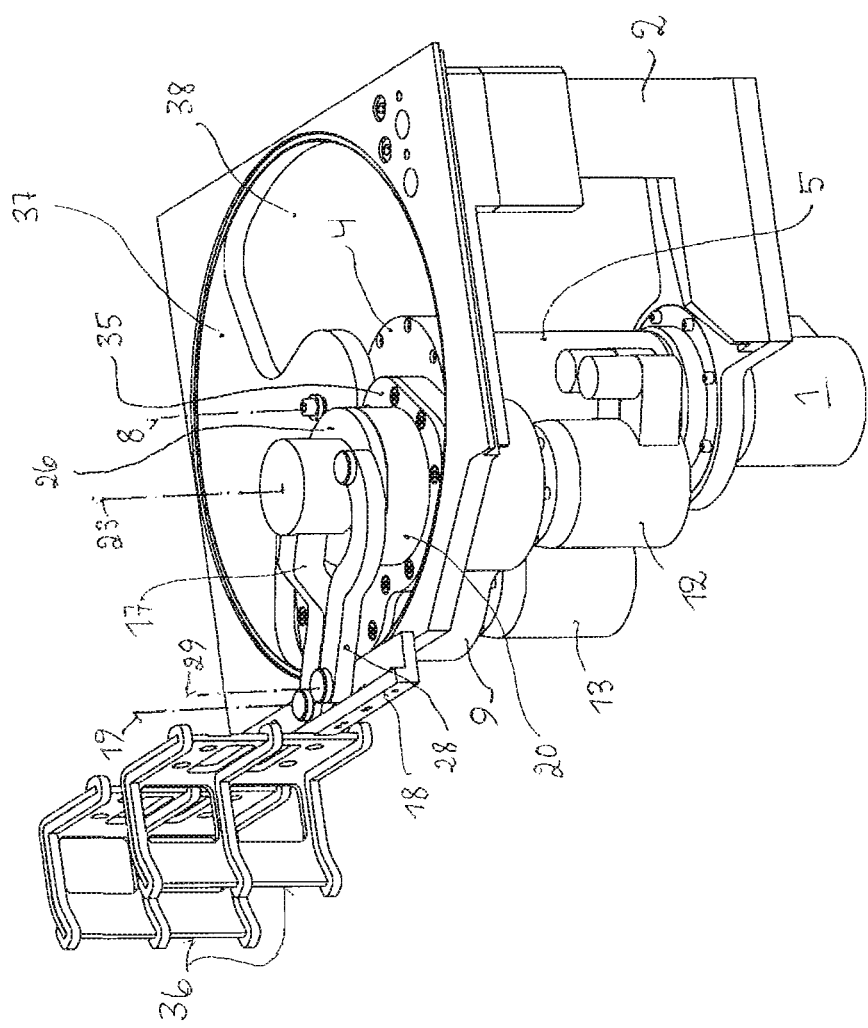
FIG. 4 shows a perspective top view of the device of FIG. 1.

As shown above, the first electric motor 1 is drivingly connected to the receiving body 9 and thus the projection part 20 which on its upper side protrudes from a recess 38 formed in a cover 37. Disposed in this recess 38, the shape of which can be seen in FIG. 3, is the projection part 20 in such a manner as to be eccentrically pivotable about the positionally-fixed axis 8, reciprocating within this recess 38 by means of the electric motor 1.

The second electric motor 12 is drivingly connected to the crank arm 17, in particular with regard to the production of a rotational movement of the point of articulation, which can be defined by the position of the axis 19, on the pusher 18 relative to the axis 23 of the driven shaft 14 which can move together with the beam 4.

The third electric motor 13 is drivingly connected, via the mutually engaged toothed rings 25, 30, to the annular body 26 and thus the push rod 28 for producing a rotational movement of the pusher 18 relative to the crank arm 17 about the axis 19.

Reference numeral 49 designates a housing, within which the electric motors 1, 12, 13 and the gear parts mentioned above are disposed and are protected against environmental influences. In addition, a protective sheet 50 is provided which forms the upper termination and is provided merely with one opening adapted to the projection part 20. The protective sheet 50 moves during operation of the device together with the projection part 20 and is connected to the housing 49 with the interposition of a seal 51.

The space delimited by the receptacles 10, 11 and the projection part 20 and closed on the upper side by the cover part 35 and the annular body 26 can be filled with oil since this space is closed on the lower side by facing housing parts of the electric motors 12, 13. In this manner, a lubrication system geared towards the service life of the device can be produced.

Bearing points which are subjected to a great deal of heat can be formed as dry sliding bearings which are considered to require no maintenance and are simpler to replace than roller bearings.

In order to explain the pushing movement, reference is made hereinafter in particular to FIG. 3.

Reference numeral 39 designates a dead plate, positioned on which by way of example are three glass objects 40, which are to be pushed, in an arrangement extending perpendicularly with respect to a direction 41, in which the conveying direction of a conveyor belt 42 moving at a uniform speed extends.

By correspondingly controlling the electric motors 1, 12 and 13, partial movements are now generated, the superposition of which being able to produce a closed curve 43 along which the points of articulation of the pusher 18, which can be defined by the positions of the axes 19, 29, and thus the pusher itself moves between a starting position, which is characterized by the pushing fingers 36 abutting against the stationary glass objects 40 on the dead plate 35 for the first time, along a curved path 44 to a point of delivery 45 at which the pushing fingers 36 are released from the glass objects 40, in that they are moved back approximately perpendicularly with respect to the conveying direction 41 along a portion 46 in order then in turn to be moved back into the starting position via a curved path 47 and a portion 48 for grasping a further group of glass objects 40.

In the point of delivery 45, the pushing fingers 36 move at the same speed as the conveyor belt 42. The superposition of said three partial movements can be arranged such that the curve 43 issues before the point of delivery 45 tangentially in a point in the direction 41 which means that subsequent thereto the pushing fingers 36 move along a linear path element subsequent to said point in the same direction and at the same speed as the conveyor belt 42. This ensures a smooth transfer preventing the glass objects from toppling over and similarly from being inaccurately positioned on the conveyor belt 42.

The curve 43 is further configured with the proviso that the glass objects 40 are arranged on the conveyor belt 42 one behind the other in the direction 41.

The time taken to travel the curve 43 thus defines the operating cycle of the device.

LIST OF REFERENCE NUMERALS

1. Electric motor
2. Frame
3. Driven shaft
4. Beam
5. Hollow cylinder
6. Roller bearing
7. Roller bearing
8. Axis
9. Receiving body
10. Receptacle
11. Receptacle
12. Electric motor
13. Electric motor
14. Shaft
15. Roller bearing
16. Roller bearing
17. Crank arm
18. Pusher
19. Axis
20. Projection part
21. Roller bearing
22. Roller bearing
23. Axis
24. Hollow shaft
25. Toothed ring
26. Annular body
27. Axis
28. Push rod
29. Axis
30. Toothed ring
31. Driven shaft
32. Roller bearing
33. Roller bearing
34. Projection part
35. Cover part
36. Pushing finger
37. Cover
38. Recess
39. Dead plate
40. Glass object
41. Direction
42. Conveyor belt
43. Curve
44. Path
45. Point of delivery
46. Portion
47. Path
48. Portion
49. Housing
50. Protective sheet
51. Seal
52. Hub
53. Hollow shaft

The invention claimed is:
1. A device for pushing glass objects from a dead plate of a section of an I.S. (individual section) glassware forming machine onto a conveyor belt moving in a direction; comprising:

a pusher which is arranged to push the glass objects and is mounted on one end of a lever so as to be pivotable about a first vertical axis, wherein the other end of the lever is connected to a vertically extending shaft which is mounted so as to be pivotable about a second vertical axis, wherein the shaft is disposed so as to be eccentrically rotatable about a positionally-fixed, vertically extending axis (fixed axis);

a first electric motor arranged to produce a rotational movement of the shaft about the fixed axis, said first electric motor being positionally-fixed and having a vertically extending driven shaft;

a second electric motor arranged to produce a rotational movement of the shaft about the second vertical axis;

a third electric motor arranged to produce a rotational movement of the pusher about the first vertical axis relative to said lever;

a beam on which said second and third electric motors are held, said beam being mounted so as to be rotatable about the fixed axis and is connected to the vertically extending driven shaft of the first electric motor in a rotationally-fixed manner wherein said lever is a crank arm connected to the shaft in a rotationally-fixed manner;

a push rod having one end which is articulated on the pusher at a spaced disposition with respect to the first axis so as to be pivotable about a third vertical axis, the other end of the push rod being drivingly connected to the third electric motor along a fourth vertical axis and forming a four bar chain with the crank arm and the pusher;

a receiving body provided with two receptacles and which is fixedly connected to the beam, wherein the second and third electric motors are held in the two receptacles in an eccentric manner with respect to the fixed axis; and a cover part which closes an upper side of said receiving body, wherein a projection part extending coaxially with respect to the second axis protrudes from the cover part, wherein a hollow shaft is mounted within the projection part so as to be rotatable about the second axis and is connected to an annular body on which the facing end of the push rod is articulated so as to be pivotable about the fourth vertical axis.

2. A device as claimed in claim 1 wherein the hollow shaft is drivingly connected to the third electric motor via a spur gear mechanism.

3. A device as claimed in claim 1, further comprising a housing accommodating at least the first, second and third electric motors and comprising on the upper side a cover provided with a recess, wherein the dimensions and position of the recess are adapted to the reciprocating rotation, during an operating cycle of the device, of the projection part about the fixed axis.

4. A device as claimed in claim 3, further comprising a protective sheet which lies on the cover, which comprises an opening for the sealing through-passage of the projection part and is guided on the edge side in a sealing manner in a cut-in in the cover so as to rotate with the projection part about the fixed axis.

5. A device as claimed in claim 3, wherein the first electric motor is held in a frame fixed to the housing.

6. A device as claimed in claim 1, further comprising a perpendicularly extending hollow cylinder disposed on the beam, with the beam being mounted in the hollow cylinder so as to be rotatable about the fixed axis.

7. A device as claimed in claim 6, further comprising a hollow hub on which the hollow cylinder is mounted so as to be rotatable about the fixed axis and within which the driven shaft of the first electric motor extends.

8. A device as claimed in claim 3, wherein the housing is located below the plane of the dead plate.

9. A device as claimed in claim 2, further comprising a housing accommodating at least the first, second and third electric motors and comprising on the upper side a cover provided with a recess, wherein the dimensions and position of the recess are adapted to the reciprocating rotation, during an operating cycle of the device, of the projection part about the fixed axis.

10. A device as claimed in claim 9, further comprising a protective sheet which lies on the cover, and which comprises an opening for the sealing through-passage of the projection part and is guided on the edge side in a sealing manner in a cut-in in the cover so as to rotate with the projection part about the fixed axis.

11. A device as claimed in claim 4, wherein the first electric motor is held in a frame fixed to the housing.

12. A device as claimed in any claim 2, further comprising a perpendicularly extending hollow cylinder disposed on the beam, with the beam being mounted in the hollow cylinder so as to be rotatable about the fixed axis.

13. A device as claimed in any claim 3, further comprising a perpendicularly extending hollow cylinder disposed on the beam, with the beam being mounted in the hollow cylinder so as to be rotatable about the fixed axis.

14. A device as claimed in any claim 4, further comprising a perpendicularly extending hollow cylinder disposed on the beam, with the beam being mounted in the hollow cylinder so as to be rotatable about the fixed axis.

15. A device as claimed in any claim 5, further comprising a perpendicularly extending hollow cylinder disposed on the beam, with the beam being mounted in the hollow cylinder so as to be rotatable about the fixed axis.

16. A device as claimed in claim 4, wherein the housing is located below the plane of the dead plate.

17. A device as claimed in claim 5, wherein the housing is located below the plane of the dead plate.

18. A device as claimed in claim 6, further comprising a housing located below the plane of the dead plate.

19. A device as claimed in claim 7, the further comprising a housing located below the plane of the dead plate.

20. A device as claimed in claim 12, further comprising a hollow hub on which the hollow cylinder is mounted so as to be rotatable about the fixed axis and within which the driven shaft of the first electric motor extends.

* * * * *